March 20, 1962

H. C. MOLENAAR 3,025,550

RECIPROCATING PUMPS

Filed May 15, 1958

INVENTOR
HENRI CHARLES MOLENAAR

BY
his ATTORNEYS

March 20, 1962  H. C. MOLENAAR  3,025,550
RECIPROCATING PUMPS

Filed May 15, 1958  2 Sheets-Sheet 2

INVENTOR
HENRI CHARLES MOLENAAR

BY *his* ATTORNEYS

United States Patent Office 3,025,550
Patented Mar. 20, 1962

3,025,550
RECIPROCATING PUMPS
Henri Charles Molenaar, Stevinstraat 177,
The Hague, Netherlands
Filed May 15, 1958, Ser. No. 735,418
Claims priority, application Netherlands May 18, 1957
14 Claims. (Cl. 15—250.02)

The invention relates to a reciprocating pump, particularly for use with a windscreen cleaning system for automobiles, and comprising a spring loaded actuating or operating member urged by the spring to occupy the end position of its discharge stroke, an opening controlled by a check valve to admit liquid to the pump chamber and an opening to discharge liquid therefrom.

It is an object of the present invention to provide a pump which when actuated automatically sets in operation the windscreen wiper and keeps the wiper in operation during delivery of washing liquid to the windscreen and subsequently for a predetermined period of time after the delivery of liquid to the windscreen has ceased.

Another object of the invention is to arrange a pump to act as a control for supplying electric current to an electric motor for driving the windscreen wiper when the pump is actuated and to maintain said supply of current during delivery of liquid by the pump to the windscreen and during a predetermined period of time after the delivery of liquid to the windscreen has ceased.

Still another object of the invention is to provide a pump for use with a windscreen cleaning system having a vacuum motor for driving the windscreen wiper.

It is also an object of the invention to provide a pump for a windscreen cleaning system in which the means for connecting a source of power with the windscreen driving motor when the pump is actuated and for maintaining said connection for a predetermined period of time after the delivery of liquid to the windscreen has ceased are located within the pump housing.

According to the invention the above and other objects are obtained by providing the side of the actuating or operating member remote from the pump chamber with means which connect a source of power with a motor for driving the windscreen wiper as long as the actuating or operating member occupies any position other than its end position, a resilient member being arranged in the pump chamber between the actuating or operating member and the discharge opening for substantially preventing discharge of liquid from the pump chamber through said opening when the actuating or operating member occupies a position between its end position and a position which is a predetermined distance away from said end position, and means for allowing liquid to be discharged slowly from the pump chamber.

The invention will now be described with reference to the accompanying drawing, in which.

In the various drawings like parts are designated with the same reference numerals.

Figure 1:
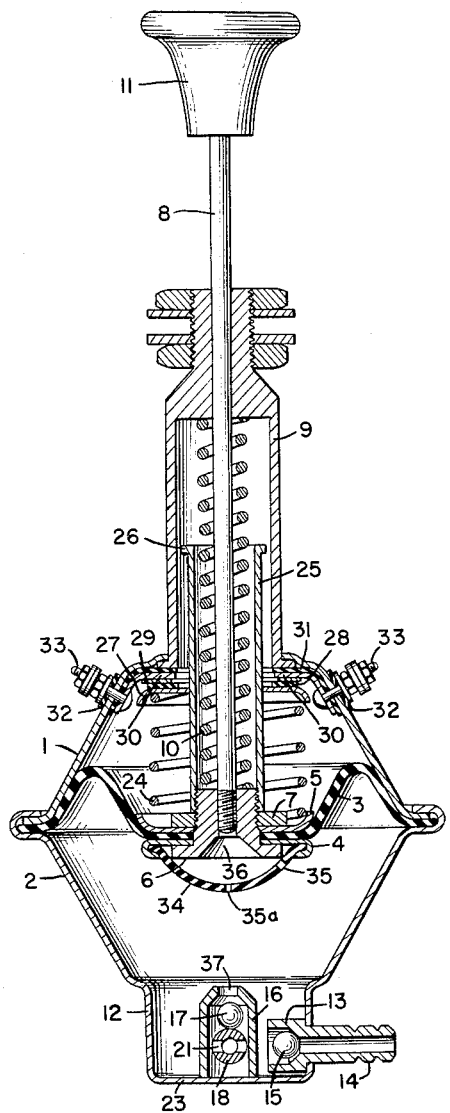
FIG. 1 is a longitudinal section of a first embodiment of the pump according to the invention, the actuating or operating member occupying a position during its operation.

Referring to FIG. 1, the pump housing is constituted by two conical halves 1 and 2 between which an actuating or operating diaphragm 3 is clamped around its circumference. The diaphragm is clamped at its centre between two clamping plates 4 and 5 which are firmly clamped together by means of a bolt 6 and a nut 7. Screwed into the bolt 6 is a rod 8 slidably mounted in a guide 9 of such a length that a spring 10 surrounding said rod can be housed entirely within the guide 9 when said spring is compressed.

At its end the rod 8 is provided with an operating knob 11 which is located at the frontside of the instrument panel of an automobile.

The end of the guide 9 is provided with a threaded portion which is inserted through a hole in the instrument panel of a vehicle. Two nuts are mounted on the threaded portion and can be tightened against opposite sides of the instrument panel to support the pump thereon.

The part 2 of the pump casing, which part contains the pump chamber, is provided with and forms part of a valve casing 12, in which the suction valve and the discharge valve are housed. The suction valve comprises a valve body in the form of a ball 15 located in a valve housing 13 with a valve seat and a connecting nipple 14 for the suction line. This valve is fixed, such as by soldering, in an opening in the wall of the valve casing 12 and preferably has, after the pump is mounted on the instrument panel of an automobile, a vertical position so that the ball 15 is retained in the valve housing 13 by the housing 16 of the discharge valve, the space between the housing 13 and the discharge valve housing 16 being of course smaller than the diameter of ball 15.

During the discharge stroke the valve body, in the form of a ball 17, of the discharge valve is retained in its housing 16 by a tube 18 fixed, such as by soldering, in said discharge valve housing 16, the ends of tube 18 constituting each a connecting nipple for a discharge line to a jet. In the wall of tube 18 is an opening 21 so located that it cannot become closed by the ball 17.

The outer end of the housing 16 of the discharge valve is closed by the end wall 23 of the pump casing because the housing 16 is fixed to this wall, such as by soldering.

In the embodiment shown in FIG. 1 a compression spring 24 is accommodated with one end in plate 5 and with its other end in a plate 27. Plate 27 carries by means of an insulated ring 28 a contact ring 29 which is fixed to ring 28. In the position of the actuating or operating diaphragm 3 shown the contact ring 29 is pressed against two terminals 30 each of which is fixed within the pump housing by a clamping bolt and terminal 33. Insulators 31 between the pump housing and the terminals 30 provide an insulated suspension of the terminals 30 and washers 32 of an insulated material provide an insulated fixation of the bolts 33. One of the bolts is connected with the battery and the other bolt is connected with the motor for driving the windscreen wiper. This circuit, of course, is in parallel to a circuit for supplying electric current to the wiper motor for regular operation.

Screwed on bolt 6 is a tube 25 extending slidably through a central aperture of plate 27 and constituting a guide for this plate. Tube 25 carries at its free end a flange 26 acting as an abutment, the length of tube 25 being such that flange 26 abuts against plate 27 just before the actuating or operating diaphragm 3 reaches the end of its discharge stroke. When flange 26 abuts against plate 27 this plate 27 is carried along with flange 26 thus interrupting the electric connection between terminals 30, whereby the supply of current to the windscreen wiper motor is interrupted.

The side of the diaphragm 3 facing the pump chamber carries a diaphragm 34 of resilient material, such as rubber, having the shape of a segment of a sphere. With the embodiments shown diaphragm 34 is clamped around its circumference between clamping plate 4 and its inwardly bent rim. An aperture 35 arranged in diaphragm 34 provides for an equal static pressure at both sides of the diaphragm in all circumstances.

The curvature of diaphragm 34 is such that it covers the discharge opening 37 in the pump chamber before flange 26 of tube 25 abuts plate 27 carrying contact ring 29.

The moment that diaphragm 34 covers opening 37 the stream of liquid delivered to the windscreen is cut off or is choked to such an extent that it does not reach the windscreen anymore, resulting in a strong decrease of the speed of diaphragm 3. However, diaphragm 3 and the parts attached to it do not come to a full standstill because measures have been taken that after opening 37 is covered by diaphragm 34 liquid can still be discharged slowly from the pump chamber. This latter discharge of liquid can be obtained by providing diaphragm 34 with a small central opening 35a which coincides with the discharge opening 37 when this opening is covered by the diaphragm. Another solution to maintain a narrow communication between the interior of the pump chamber and the discharge line when opening 37 is covered by diaphragm 34 is to arrange a narrow groove (not shown) either in the diaphragm 34 or in the material surrounding opening 37, which groove is turned into a channel the moment that diaphragm 34 contacts the material surrounding the opening 37.

A preferred solution to assure that liquid can be discharged from the pump chamber after diaphragm 34 has covered opening 37 is to arrange the inlet check valve 15 in such a manner that it has not a close fit with its seat. With the embodiments shown this can be obtained by providing the seat of the ball valve 15 with a narrow groove (not shown). The latter solution results in that a small part of the quantity of liquid drawn into the pump during the suction stroke is returned into the suction line during the discharge stroke.

After opening 37 is covered by diaphragm 34 whereby the supply of liquid to the windscreen is stopped and whereby the speed of diaphragm 3 is strongly decreased, but before diaphragm 34 by its movement towards the housing 16 of the discharge valve has been moved by this housing into the recess 36 of bolt 6 to the maximum extent (which action delimits the end of the discharge stroke), flange 26 abuts plate 27 whereby the supply of current to the windscreen wiper motor via terminals 30 is interrupted. By this arrangement the windscreen wiper is kept in operation for a predetermined period of time after the supply of liquid onto the windscreen has ceased.

Figure 2:
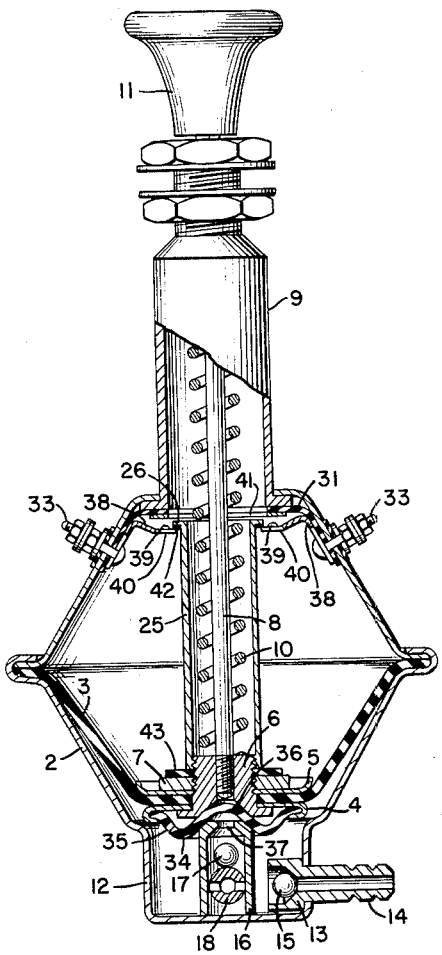
FIG. 2 is a longitudinal section of a second embodiment, the actuating or operating member occupying its end position.

With the embodiment shown in FIG. 2 the means for connecting a source of power with the windscreen wiper motor comprise a pair of contacts 39 each carried by a resilient blade spring 38 attached within the pump housing. Springs 38 are attached to the pump housing in an insulated manner by terminal bolts 33. The reference numeral 31 denotes the insulators between springs 38 and the pump housing. The insulators 31 carry a contact ring 41 against which the springs 38 urge the contacts 39 when the pump is operated, so that an electric circuit of the windscreen wiper motor is closed.

The end 40 of each spring is in the path of flange 26 arranged at the free end of tube 25 fixed to the actuating or operating member. Flange 26 carries a ring 42 of insulating material which abuts against the ends 40 of springs 38 just before the actuating or operating member reaches the end of its discharge stroke, whereby the contacts 39 are lifted from contact ring 26 and the supply of current to the wiper windscreen motor is cut off. Because the diaphragm 34, in the same manner as has been described with reference to FIG. 1, covers discharge opening 37 when the actuating or operating member during its discharge stroke has reached a position at some distance from its end position, which distance is determined by the spherical shape of diaphragm 34, the supply of liquid to the windscreen is also cut off a predetermined period of time before the supply of current to the windscreen wiper motor is cut off.

To avoid the hazard of short-circuiting the battery of the automobile a ring 43 of insulating material is arranged at the foot of tube 25 so that nut 7 cannot contact springs 38 at the end of the suction stroke. Instead of providing the pump with the rings 42 and 43 of insulating material the tube 25 and the nut 7 may be made from insulating material.

Figure 3:
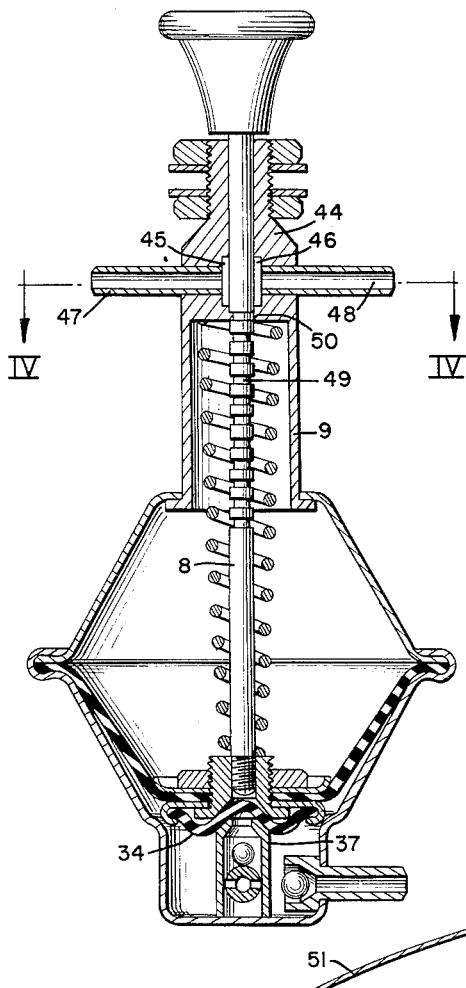
FIG. 3 is a longitudinal section of a third embodiment with the actuating or operating member also shown in its end position.
Figure 4:
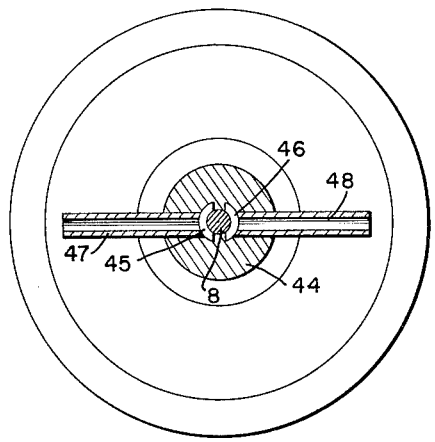
FIG. 4 is a cross section taken along line IV—IV of FIG. 3.

In case the pump is to be used with a windscreen cleaning system incorporating a vacuum motor for driving the windscreen wiper a pump as shown in FIGS. 3 and 4 may be used. With this embodiment the guide 44 of rod 8 is provided with two chambers 45 and 46 not in communication with each other and opening onto rod 8. The chambers 45 and 46 are arranged diametrically opposite each other with respect to rod 8 and are each in communication with a nipple 47 and 48 of guide 44, which nipples are intended to be connected by means of a vacuum tube to the vacuum motor for driving the windscreen wiper and to a source of vacuum respectively.

Rod 8 is provided with a number of radial grooves 49, the distance between adjacent grooves 49 being smaller than the height of chambers 45, 46 in axial direction of rod 8. The radial groove 50 of rod 8, which groove is the last groove to intercommunicate chambers 45 and 46 during the discharge stroke of the actuating or operating member 3, is arranged so that it cuts off the connection between chambers 45 and 46 just before the actuating or operating member reaches its end position. Thus, the chambers 45 and 46, and therefore the windscreen wiper vacuum motor and the source of vacuum, are interconnected as long as the actuating or operating member 3 occupies any position other than its end position. Because also with this embodiment the diaphragm 34 covers the discharge opening 37 of the pump chamber before the communication between chambers 45 and 46 is cut off the windscreen wiper motor is kept in operation a predetermined period of time after the delivery of liquid to the windscreen has ceased.

Figure 5:
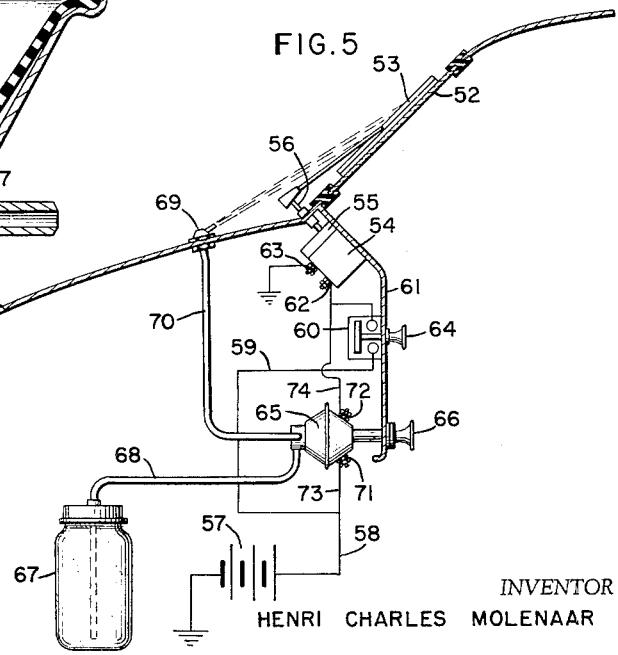
FIG. 5 is a schematic illustration of a windshield washer embodying the present invention installed in a motor vehicle, parts of the vehicle being shown in section.

A typical installation of a windshield washing system embodying the present invention is illustrated in FIG. 5. A part of a hood 51, of a vehicle is shown together with the windshield 52 and a windshield wiper 53 which is driven by means of an electric windshield wiper motor 54, a transmission box 55 and a shaft 56 on which the wiper arm is mounted. Power for driving the windshield wiper motor 54 is supplied by a storage battery 57 or the like having one terminal grounded on the vehicle. The other terminal is connected by means of conductors 58 and 59 to one terminal of a switch 60 mounted on the instrument panel 61 of the vehicle. The other terminal of the switch 60 is connected with the terminal 62 of the motor, the opposite terminal 63 which is connected to ground. When the switch 60 is closed by means of the switch knob 64 which extends in front of the instrument panel, the motor is actuated to cause the blade to wipe back and forth across the windshield 52. All of the above mentioned structure is conventional.

A pump 65 of the type shown in FIGURES 1–4 of the drawings is mounted behind the instrument panel 61.

The pump 65 has its actuating knob 66 in front of the panel 61. Windshield washing liquid is supplied to the pump 65 from a jar or container 67 through a conduit or tube 68 and is sprayed against the windshield by a nozzle 69 in the hood 51. Liquid is delivered to the nozzle through a tube 70 connected to the pump. The pump switch is connected in parallel with the windshield wiper switch 60 between the battery 57 and the terminal 62 of the motor 54. The ungrounded terminal of the battery 57 is connected by conductors 58 and 73 to the terminal 71 of the pump switch and its other terminal 72 is connected by means of the conductor 74 to the terminal 62 of the motor 54. Operation of the windshield wiper motor 54, therefore, is selectively responsive to the pump 65 as described above or the windshield wiper switch 60.

What is claimed is:

1. A windshield washer for cooperation with a windshield wiper having a driving motor, comprising a hollow casing having a pumping chamber therein, a pumping member movable in said casing for drawing liquid into and discharging liquid from said pumping chamber, control means in said casing for connecting said driving motor to a source of power, means connected to and movable with said pumping member for acuating said control means to disconnect said motor from said source when the pumping member is substantially at the end of its discharge stroke, and means responsive to movement of said pumping member as it approaches the end of its discharge stroke for restricting discharge of liquid from said pumping chamber to maintain said motor connected to said source for a period of time after discharge of liquid from said pumping chamber has substantially ceased.

2. The windshield washer set forth in claim 1 in which the control means comprises at least one electrical contact, a conducting member normally engaging said contact and abutment means on and movable with said pumping member for disengaging said contact and said conducting member when the said pumping member reaches the end of its discharge stroke.

3. The windshield washer set forth in claim 2 in which the means for disengaging said conducting member and said terminal comprises a tube having a flange thereon fixed to said pumping member.

4. The windshield washer set forth in claim 2 in which the conducting member is mounted resiliently in said casing and is insulated therefrom and is displaceable out of engagement with said contact by said abutment means.

5. The windshield washer set forth in claim 2, in which said conducting member is fixed relative to and insulated from said casing and said electrical contact is resilient and is displaceable out of engagement with said conducting member by said abutment means.

6. The windshield washer set forth in claim 1, in which the control means comprises a rod connected to and movable with said pumping member, a guide tube in said casing having ports on opposite sides of said rod, said ports being adapted to be connected to a source of vacuum and to said motor, said rod having a plurality of grooves therein for connecting said ports at all times except when said pumping member is at the end of said discharge stroke, said rod being free of grooves at a zone disposed between said ports when said pumping member reaches the end of its discharge stroke to isolate the ports from each other.

7. A windshield washer for cooperation with a windshield wiper having a motor to be actuated by a source of power, comprising a liquid pumping device having a pumping chamber and a reciprocable plunger movable in one direction in said chamber for drawing liquid into said chamber and in the opposite direction to discharge liquid, means for biasing the plunger to the limit of its discharge movement, control means on said liquid pumping device outside said pumping chamber for connecting said source and said motor, means movable with said pumping member for actuating said control means to disconnect said motor and said source when said pumping member is substantially at the limit of its discharge movement, and means in said pumping chamber and actuated by said pumping member as it approaches the limit of said discharge movement for restricting discharge of liquid from said pumping chamber and retarding the discharge movement of said pump member thereby to continue actuation of said motor after discharge of liquid has substantially ceased.

8. A windshield washer comprising a hollow casing containing a pumping chamber having an inlet opening and a discharge opening, valve means controlling said openings to enable liquid to be drawn into said pumping chamber through said inlet opening and discharged through said discharge opening, a pumping member movable in said pumping chamber to draw liquid into and discharge liquid from said pumping chamber through said inlet and discharge openings, respectively, spring means engaging said pumping means to move it to the end of its discharge movement in said chamber, control means in said casing and outside said chamber for connecting a windshield wiper motor to a source of power for driving said motor as long as the pumping member occupies a position other than substantially at the end of its discharge movement, means responsive to movement of said pumping member to the end of its discharge movement for actuating said control means to disconnect said motor from said source, means interposed between said pumping member and said discharge opening for restricting the rate of discharge of liquid from said pumping chamber as the pumping member approaches the end of its discharge movement to continue the operation of said motor after discharge of liquid from said pumping chamber has substantially ceased.

9. A windshield washer for cooperation with a windshield wiper having a driving motor to be actuated by a source of power comprising a casing, a pumping member mounted movably in said casing and dividing it into a pumping chamber and another chamber, inlet and discharge openings in said casing communicating with said pumping chamber, check valves controlling said openings to enable liquid to be drawn into said chamber by movement of said pumping member in one direction and to discharge liquid from said chamber on movement of said pumping member in the opposite direction, means in said casing biasing said pumping member to its limit of movement in said opposite direction, control means in said other chamber for connecting and disconnecting said source and said motor, means movable with said pumping member for actuating said control means to disconnect said source and said motor when said pumping member is at its limit of movement in said opposite direction, said control means being actuated to connect said source and said motor in all positions of said pumping member except at said limit of movement, and means mounted on said pumping member for at least partially closing said discharge opening to restrict discharge of liquid therethrough and retard movement of said pumpnig member as it approaches said limit of movement.

10. The windshield washer set forth in claim 9, in which the means mounted on said pumping member for at least partially closing said discharge opening comprises a diaphragm of resilient material mounted on the pumping member and movable therewith.

11. The windshield washer set forth in claim 10, in which the resilient diaphragm has the shape of a segment of a sphere.

12. The windshield washer set forth in claim 10, in which the diaphragm has an aperture therein for equalizing the pressure on opposite sides of said diaphragm.

13. The windshield washer set forth in claim 9, comprising a restricted passage between the means mounted on said pumping chamber and the discharge opening through which liquid can escape slowly.

14. The windshield washer set forth in claim 9, comprising a restricted passage between said pumping chamber and said inlet opening through which liquid can escape slowly from the pumping chamber when the discharge opening is closed.

References Cited in the file of this patent

UNITED STATES PATENTS

| | | |
|---|---|---|
| 2,206,814 | Horton | July 2, 1940 |
| 2,827,652 | Oishei | Mar. 26, 1958 |
| 2,856,626 | Marte | Oct. 21, 1958 |
| 2,873,467 | Oishei | Feb. 17, 1959 |